J. HANCOCK.
OIL DISPENSING PLANT.
APPLICATION FILED FEB. 12, 1917.
1,287,004.
Patented Dec. 10, 1918.
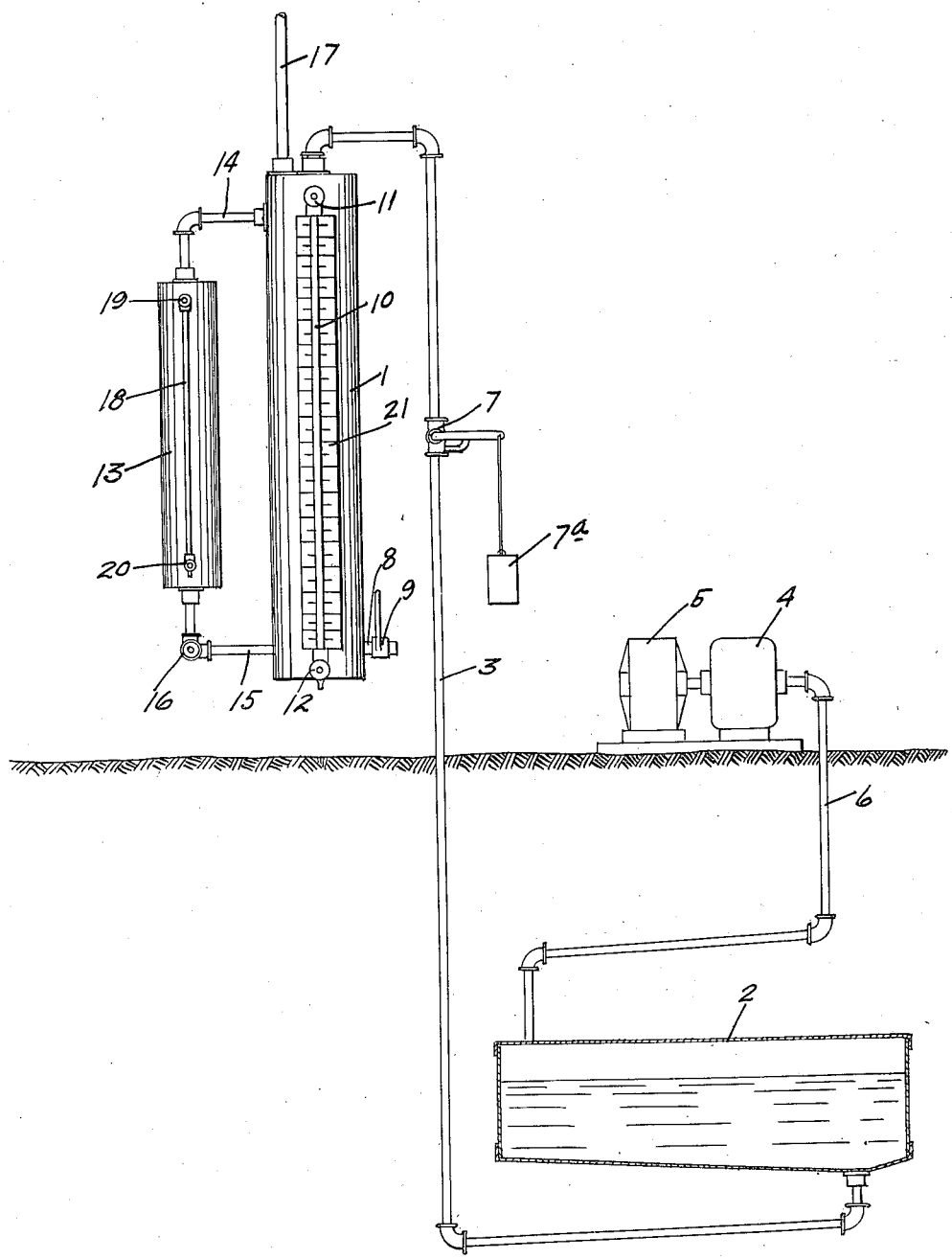
WITNESSES
E. C. Wells
H. L. Opsahl.
INVENTOR
John Hancock
BY HIS ATTORNEYS
Williamson Merchant

UNITED STATES PATENT OFFICE.

JOHN HANCOCK, OF MINNEAPOLIS, MINNESOTA.

OIL-DISPENSING PLANT.

1,287,004.

Specification of Letters Patent.  Patented Dec. 10, 1918.

Application filed February 12, 1917.  Serial No. 148,088.

*To all whom it may concern:*

Be it known that I, JOHN HANCOCK, a citizen of the United States, residing at Minneapolis, in the county of Hennepin and State of Minnesota, have invented certain new and useful Improvements in Oil-Dispensing Plants; and I do hereby declare the following to be a full, clear, and exact description of the invention, such as will enable others skilled in the art to which it appertains to make and use the same.

My present invention has for its object to provide an improved liquid vending plant or apparatus especially adapted for use at so-called oil filling stations where gasolene is dispensed to the automobile trade.

To the above ends the invention consists of the novel devices and combinations of devices hereinafter described and defined in the claims.

My present apparatus is in the nature of an improvement on or modification of the dispensing apparatus disclosed and broadly claimed in my Patent No. 1,215,801, of date February 13, 1917, and entitled "Oil dispensing apparatus."

The invention is illustrated in the single view of drawings partly in front elevation and partly in vertical section.

As the feature of improvement over the form of apparatus specifically illustrated in the drawings and broadly covered by the claims of said patent, I provide in connection with the main or dispensing tank, an over-flow tank, normally connected thereto to receive the over-flow therefrom due to over-filling, and having a valved connection through which said over-flow tank may, at will, be caused to deliver its contents back into the said main or dispensing tank, under the action of gravity.

The parts of the apparatus shown in the drawings are as follows:

The numeral 1 indicates an upright main or dispensing tank, which in practice will be located at a suitable elevation above the ground. The numeral 2 indicates a supply tank which in practice should be capable of holding a very large amount of gasolene as compared with the dispensing tank 1, and which is advisably located below the surface of the ground. The bottom of this tank 2 is connected by pipe 3 to the top of the dispensing tank 1. An air compressor 4 driven by an electric motor 5, or any other suitable means, is connected to the top of the supply tank 2 by an air pipe 6.

The pipe 3 has a valve 7 that is automatically closed by a weight 7ª.

The dispensing tank 1 is provided with a dispensing tube 8 leading from one side thereof, preferably at a point considerably above the bottom thereof. The dispensing tube 8 is normally closed by a valve 9, and in practice it would be connected to a flexible delivery hose or tube.

The numeral 10 indicates a long upright transparent sight tube, the upper end of which is connected to the upper portion of the dispensing tank 1, by a valve casing 11, and the lower end of said tube is connected to the lower portion of said dispensing tank by a valve casing 12.

The numeral 13 indicates an over-flow tank, which is preferably of less holding capacity than the dispensing tank 1, and is located close thereto in upright position, with its upper portion connected to the upper portion of said dispensing tank by a short connecting tube 14, and with its lower portion connected to the lower portion of said dispensing tank, by a return tube 15, equipped with a normally closed valve 16.

The vent pipe 17 extends from the top of the dispensing tank 1, upward to a suitable point. A sight tube 18 is connected at its upper end to the upper portion of the over-flow tank 13 by a valve-equipped tube 19, and the lower portion of said sight tube is connected to the lowest portion of the said over-flow tank by a valve-equipped tube 20.

The numeral 21 indicates a scale associated with and secured in respect to the sight tube 10. The scale 21 is graduated to indicate in gallons and fractions thereof the amount of gasolene or liquid contained in the dispensing tank 1, between the level of the dispensing tube 8 and the level of the over-flow tube 14.

The scale 21 is preferably graduated progressively from top toward bottom to indicate the number of gallons of liquid contained in the dispensing tank from the level of the over-flow tube 14 in a downwardly direction toward the dispensing tube 8. The zero mark of the scale 21 is located at the level of the over-flow tube or port 14.

When the dispensing tank is to be filled, the valves 9 and 16 should, of course, be closed. Then, when by the operation of the air compressor proper pressure of air is produced in the top of the supply reservoir 2, and the valve 7 is opened, the oil or gasolene will be delivered from said tank into the said dispensing tank, and the latter will be filled up to but not above the over-flow tube or port 14; or, in other words, the said dispensing tank will be filled to the maximum height, which is at the level of the zero mark of the scale 21. The automatically closed valve in pipe 3 is preferably employed so as to insure stopping of the flow or delivery of oil or liquid to the dispensing tank whenever the operator takes his hand off from said valve.

When the said dispensing tank has thus been filled to the level of the over-flow tube 14, the liquid, if it continues to be supplied from the supply reservoir, will over-flow into over-flow tank 13.

Oil may be drawn from the dispensing tube 8, and sold to the trade until said dispensing tank has been nearly or quite emptied, and then oil from the over-flow tank 13 may be delivered back into the dispensing tank under the action of gravity, simply by the temporary opening of the valve 16. This elevated over-flow tank, arranged to deliver back to the dispensing tank under action of gravity, obviates the necessity of the underground over-flow tank with its accompanying complications. It is an easy matter to prevent over-charging of the over-flow tank by the occasional opening of the valve 16, but this will not be required each time that the dispensing tank is filled from the supply tank or reservoir. The operator simply watches the sight tube 18 and opens the valve 16 whenever he observes that the overflow tank has become somewhat nearly full.

What I claim is:

1. A dispensing tank having an over-flow port at its upper portion and a service port at its lower portion, means controlling the discharge through said service port, a sight tube associated with said tank to disclose successive liquid levels in said tank, and an over-flow tank connected to the over-flow port of said dispensing tank, and a valve-equipped conduit connecting the lower portion of said over-flow tank back to said dispensing tank, said over-flow tank being located at an elevation for the discharge of its contents back into said dispensing tank under the action of gravity.

2. A dispensing tank having an over-flow port at its upper portion and a service port at its lower portion, means controlling the discharge through said service port, a sight tube associated with said tank to disclose successive liquid levels in said tank, and an over-flow tank having its upper portion connected to the over-flow port of said dispensing tank and a valve-equipped conduit connecting the lower portion of said over-flow tank back to said dispensing tank, said over-flow tank being located at an elevation for the discharge of its contents back into said dispensing tank under the action of gravity, and the said dispensing tank having a vent pipe leading from its upper portion.

3. A dispensing tank having an over-flow port at its upper portion and a service port at its lower portion, means controlling the discharge through said service port, a sight tube associated with said tank to disclose successive liquid levels in said tank, and an over-flow tank having its upper portion connected to the over-flow port of said dispensing tank, and a valve-equipped conduit connecting the lower portion of said over-flow tank back to said dispensing tank, said over-flow tank being located at an elevation for the discharge of its contents back into said dispensing tank under the action of gravity, and the said over-flow tank having a sight tube for disclosing the liquid levels therein.

4. A dispensing tank having an overflow port at is upper portion and a service port at its lower portion, means for controlling the discharge through said service port, means for disclosing the successive liquid levels in said tank, an overflow tank connected to the overflow port of said dispensing tank, and a valve equipped conduit connecting the lower portion of said overflow tank back to said dispensing tank, said overflow tank being located at an elevation for the discharge of liquid therefrom back into said dispensing tank under the action of gravity.

5. A dispensing tank having an overflow port at its upper portion and a service port at its lower portion, means for controlling the discharge through said service port, means for disclosing the successive liquid levels in said tank, an overflow tank to receive liquid from the overflow port of said dispensing tank, and a valve equipped conduit connecting the lower portion of said overflow tank back to said dispensing tank, said overflow tank being located at an elevation for the discharge of liquid therefrom back into said dispensing tank under the action of gravity.

In testimony whereof I affix my signature in presence of two witnesses.

JOHN HANCOCK.

Witnesses:
  EVA E. KÖNIG,
  F. D. MERCHANT.